US012745210B2

United States Patent
(12)

Cha et al.

(10) Patent No.: US 12,745,210 B2

(45) Date of Patent: Sep. 22, 2026

(54) METHODS AND DEVICES FOR MEASUREMENT REPORTING

(71) Applicant: Nokia Technologies Oy, Espoo (FI)

(72) Inventors: Hyun-Su Cha, Naperville, IL (US); Ryan Keating, Naperville, IL (US); Daejung Yoon, Nozay (FR)

(73) Assignee: Nokia Technologies Oy, Espoo (FI)

( * ) Notice: Subject to any disclaimer, the term of this patent is extended or adjusted under 35 U.S.C. 154(b) by 268 days.

(21) Appl. No.: 18/838,428

(22) PCT Filed: Feb. 14, 2023

(86) PCT No.: PCT/EP2023/053546

§ 371 (c)(1), (2) Date: Aug. 14, 2024

(87) PCT Pub. No.: WO2023/156352

PCT Pub. Date: Aug. 24, 2023

(65) Prior Publication Data

US 2025/0168807 A1 May 22, 2025

Related U.S. Application Data

(60) Provisional application No. 63/312,175, filed on Feb. 21, 2022.

(51) Int. Cl.

*H04W 64/00* (2009.01)
*H04B 17/318* (2015.01)

(Continued)

(52) U.S. Cl.

CPC .......... *H04W 64/00* (2013.01); *H04B 17/328* (2023.05); *H04L 5/0051* (2013.01); *H04W 24/10* (2013.01)

(58) Field of Classification Search

CPC .... H04W 64/00; H04W 24/10; H04B 17/328; H04L 5/0051

(Continued)

(56) References Cited

U.S. PATENT DOCUMENTS

2023/0247671 A1* 8/2023 Manolakos ........... H04L 5/0048 370/329
2023/0258760 A1* 8/2023 Lee ....................... G01S 5/0036 342/125

(Continued)

OTHER PUBLICATIONS

"Reply LS on reporting and definition of DL PRS path RSRP", 3GPP TSG-RAN WG4 Meeting #101-bis-e, R4-2202780, RAN WG4, Jan. 17-25, 2022, pp. 1-2.

(Continued)

*Primary Examiner* — Juan A Torres

(74) *Attorney, Agent, or Firm* — Nokia Technologies Oy

(57) ABSTRACT

Systems, apparatuses and/or method for positioning are provided. One method may include receiving, by a user device, a first request. The first request may indicate to the user device to report positioning reference signal (PRS) reference signal received power (RSRP) for a set of PRS resources corresponding to a previous report which indicated PRS reference signal received path power (RSRPP) of the user device previously obtained at a first time stamp. The method may also include transmitting, by the user device, a second report based on at least one status of the user device.

20 Claims, 3 Drawing Sheets

(51) Int. Cl.
*H04L 5/00* (2006.01)
*H04W 24/10* (2009.01)

(58) Field of Classification Search
USPC ....... 455/456.1, 422, 440; 340/988; 342/450
See application file for complete search history.

(56) References Cited

U.S. PATENT DOCUMENTS

| | | | | |
|---|---|---|---|---|
| 2023/0328567 | A1* | 10/2023 | Manolakos | H04W 24/10<br>370/252 |
| 2024/0073854 | A1* | 2/2024 | Rao | G01S 5/0036 |
| 2024/0345210 | A1* | 10/2024 | Li | G01S 13/003 |
| 2025/0047393 | A1* | 2/2025 | Tidestav | H04B 17/328 |
| 2025/0048326 | A1* | 2/2025 | Lee | H04W 64/003 |

OTHER PUBLICATIONS

"Maintenance of enhancing DL AoD", 3GPP TSG RAN WG1 #108-e, R1-2201636, Agenda: 8.5.3, Nokia, Feb. 21-Mar. 3, 2022, 6 pages.
"New WID: NR Positioning Support", 3GPP TSG RAN Meeting #83, RP-190752, Agenda: 9.1.1, Intel Corporation, Mar. 18-21, 2019, 6 pages.
"Revised WID on NR Positioning Enhancements", 3GPP TSG RAN Meeting #91e, RP-210897, Agenda: 9.7.25, Intel Corporation, Mar. 16-26, 2022, 6 pages.
"Maintenance of DL-AoD enhancements", 3GPP TSG-RAN WG1 Meeting #108-e, R1-2200922, Agenda: 8.5.3, Huawei, Feb. 21-Mar. 3, 2022, 9 pages.
"Maintenance on Potential Enhancements for DL-AoD positioning", 3GPP TSG RAN WG1 #108-e, R1-2202142, Agenda: 8.5.3, Qualcomm Incorporated, Feb. 21-Mar. 3, 2022, pp. 1-5.
"Maintenance of Rel. 17 NR positioning solutions for DL-AoD method", 3GPP TSG RAN WG1 #108-e, R1-2201699, Agenda: 8.5.3, Intel Corporation, Feb. 21-Mar. 3, 2022, pp. 1-11.
"Enhancements of DL-AoD positioning solutions", 3GPP TSG-RAN WG1 Meeting #108-e, R1-2202391, Agenda: 8.5.3, Ericsson, Feb. 21-Mar. 3, 2022, 7 pages.
"Msc-generator", Sourceforge, Retrieved on Jul. 3, 2024, Webpage available at :https://sourceforge.net/projects/msc-generator/.
"3rd Generation Partnership Project; Technical Specification Group Radio Access Network; LTE Positioning Protocol (LPP) (Release 16)", 3GPP TS 37.355, V16.7.0, Dec. 2021, pp. 1-299.
"3rd Generation Partnership Project; Technical Specification Group Radio Access Network; NG-RAN; NR Positioning Protocol A (NRPPa) (Release 16)", 3GPP TS 38.455, V16.6.0, Dec. 2021, pp. 1-154.
International Search Report and Written Opinion received for corresponding Patent Cooperation Treaty Application No. PCT/EP2023/053546, dated May 4, 2023, 13 pages.
"Enhancements for DL-AoD Positioning", 3GPP TSG RAN WG1 #107-e, R1-2201241, Agenda: 8.5.3, OPPO, Feb. 21-Mar. 3, 2021, 2 pages.
"Maintenance on enhancements for DL-AoD method", 3GPP TSG RAN WG1 #108-e, R1-2201095, Agenda: 8.5.3, vivo, Feb. 21-Mar. 3, 2022, 10 pages.

* cited by examiner

METHODS AND DEVICES FOR MEASUREMENT REPORTING

RELATED APPLICATION

This application was originally filed as PCT Application No. PCT/EP2023/053546 on 14 Feb. 2023, which claims priority from U.S. Provisional Application No. 63/312,175, filed on 21 Feb. 2022, each of which is incorporated herein by reference in its entirety.

TECHNICAL FIELD

Some example embodiments may generally relate to communications including mobile or wireless telecommunication systems, such as Long Term Evolution (LTE) or fifth generation (5G) radio access technology or new radio (NR) access technology or 5G beyond (e.g., 6G) access technology, or other communications systems. For example, certain example embodiments may generally relate to systems and/or methods for measurement reporting.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology and/or 5G beyond. 5G wireless systems refer to the next generation (NG) of radio systems and network architecture. A 5G system is mostly built on a 5G new radio (NR), but a 5G (or NG) network can also build on the E-UTRA radio.

It is estimated that NR provides bitrates on the order of 10 to 20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT).

With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses.

It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 5G beyond is expected to support further use cases beyond current mobile use scenarios, such as virtual and augmented reality, artificial intelligence, instant communications, improved support of IoT, etc.

SUMMARY

An embodiment may include method that includes receiving, by a user device, a first request. The first request indicates to report positioning reference signal (PRS) reference signal received power (RSRP) for a set of PRS resources corresponding to a previous report which indicated PRS reference signal received path power (RSRPP) of the user device previously obtained at a first time stamp using specific Rx beam(s) and Rx branch(es). The method may also include transmitting, by the user device, a second report based on at least one status of the user device.

An embodiment may include method that includes transmitting, by a network node, a first request to a user device. The first request indicates to the user device to report positioning reference signal (PRS) reference signal received power (RSRP) for a set of PRS resources corresponding to a previous report which indicated PRS reference signal received path power (RSRPP) of the user device previously obtained at a first time stamp using specific Rx beam(s) and Rx branch(es). The method may also include receiving, by the network node, a second report based on at least one status of the user device.

An embodiment may include apparatus that includes at least one processor and at least one transceiver. The at least one transceiver may be configured to receive a first request. The first request indicates to the apparatus to report positioning reference signal (PRS) reference signal received power (RSRP) for a set of PRS resources corresponding to a previous report which indicated PRS reference signal received path power (RSRPP) of the apparatus previously obtained at a first time stamp using specific Rx beam(s) and Rx branch(es). The at least one transceiver may also be configured to transmit a second report based on at least one status of the apparatus.

An embodiment may include an apparatus that includes at least one processor and at least one transceiver. The at least one transceiver may be configured to transmit a first request to a user device. The first request indicates to the user device to report positioning reference signal (PRS) reference signal received power (RSRP) for a set of PRS resources corresponding to a previous report which indicated PRS reference signal received path power (RSRPP) of the user device previously reported with a first time stamp. The at least one transceiver may also be configured to receive a second report based on at least one status of the user device.

An embodiment may include an apparatus including means for receiving a first request. The first request indicates to the apparatus to report positioning reference signal (PRS) reference signal received power (RSRP) for a set of PRS resources corresponding to a previous report which indicated PRS reference signal received path power (RSRPP) of the apparatus previously obtained at a first time stamp using specific Rx beam(s) and Rx branch(es). The apparatus may also include means for transmitting a second report based on at least one status of the apparatus.

An embodiment may include an apparatus including means for transmitting a first request to a user device. The first request indicates to the user device to report positioning reference signal (PRS) reference signal received power (RSRP) for a set of PRS resources corresponding to a previous report which indicated PRS reference signal received path power (RSRPP) of the user device previously reported with a first time stamp. The apparatus may also include means for receiving a second report based on at least one status of the user device.

An embodiment may include a non-transitory computer readable medium comprising program instructions for causing an apparatus to perform at least the following: receiving a first request. The first request indicates to report positioning reference signal (PRS) reference signal received power (RSRP) for a set of PRS resources corresponding to a previous report which indicated PRS reference signal received path power (RSRPP) of the apparatus previously obtained at a first time stamp. The program instructions may further cause the apparatus to perform: transmitting a second report based on at least one status of the user device.

An embodiment may include a non-transitory computer readable medium comprising program instructions for causing an apparatus to perform at least the following: transmitting a first request to a user device. The first request indicates to the user device to report positioning reference signal (PRS) reference signal received power (RSRP) for a set of PRS resources corresponding to a previous report which indicated PRS reference signal received path power (RSRPP) of the user device previously obtained at a first time stamp. The program instructions may further cause the apparatus to perform: receiving a second report based on at least one status of the user device.

BRIEF DESCRIPTION OF THE DRAWINGS

For proper understanding of example embodiments, reference should be made to the accompanying drawings, wherein.

DETAILED DESCRIPTION

Figure 1:
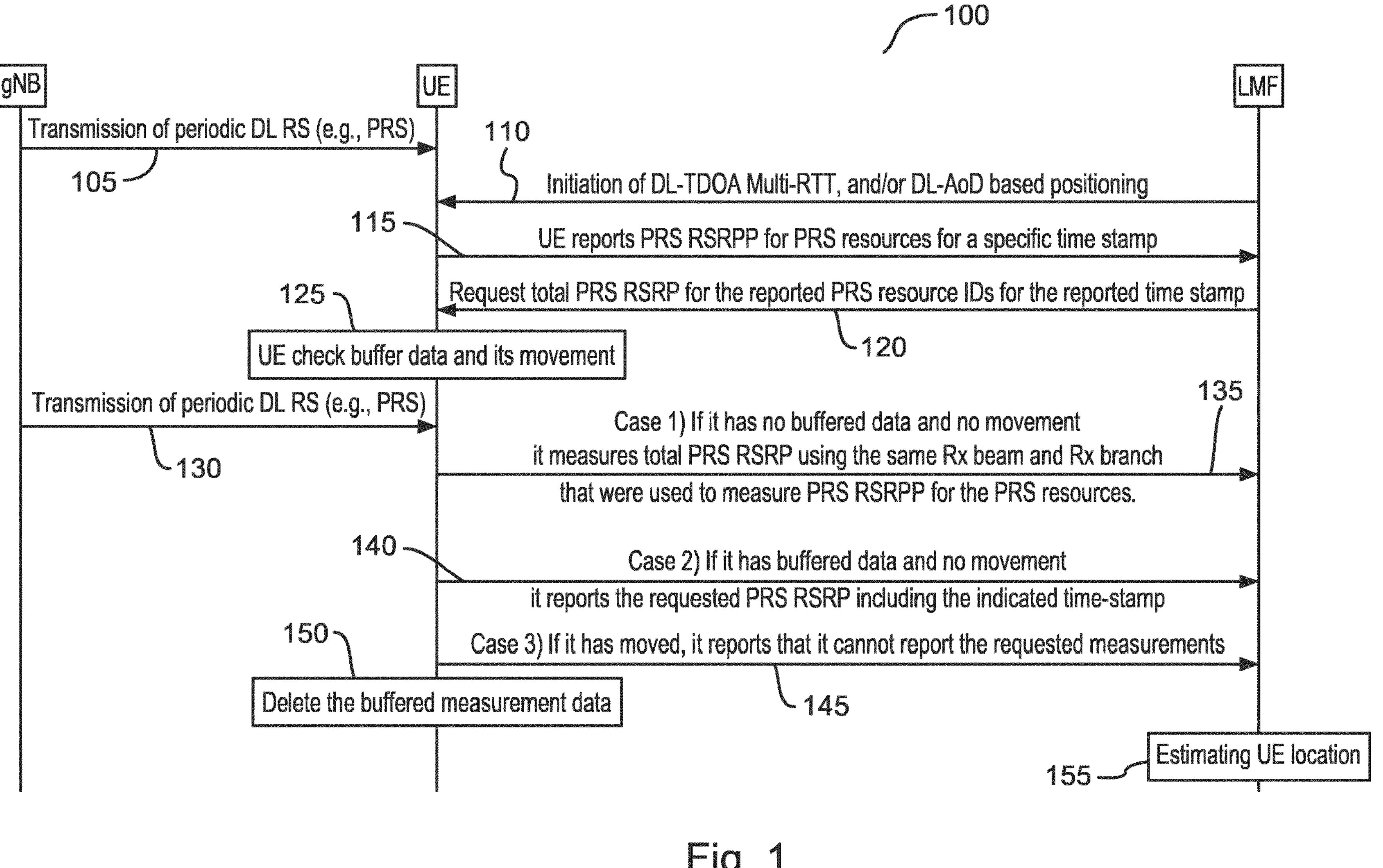
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for measurement reporting, e.g., for downlink (DL) and/or uplink (UL) based positioning, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Positioning techniques may be used to estimate a physical location of a UE. For example, the following positioning techniques may be used in NR: downlink time difference of arrival (DL-TDoA), uplink time difference of arrival (UL-TDoA), downlink angle of departure (DL-AoD), uplink angle of arrival (UL-AoA), and/or multi-cell round trip time (multi-RTT). The positioning reference signal (PRS) and sounding reference signal (SRS) may be used as reference signals for estimating the location of the UE. PRS is a reference signal for positioning in the downlink (DL). SRS is a reference signal that may be used for positioning in the uplink (UL).

In downlink positioning techniques, such as DL-TDoA and DL-AoD, the UE may measure the PRS from multiple gNBs. The UE may measure, for example, the reference signal time difference (RSTD) and/or reference signal received power (PRS-RSRP). These measurements may then be used to assist in estimating the location of the UE. The UE may report these measurements to the location management function (LMF). In downlink and uplink positioning techniques, the UE may measure the time difference between the reception time of PRS and the transmission time of SRS. The UE may report these measurements to the LMF.

Certain embodiments may relate to NR positioning. Third Generation Partnership Project (3GPP) Release-16 includes native positioning support in NR. For instance, some example embodiments may relate to the enhancement of DL or DL+UL UE-assisted positioning solutions. In particular, some example embodiments may relate to the enhancement of UE-assisted positioning solutions.

In Release-17, NR positioning enhancements are being considered such as specifying methods, measurements, signalling, and/or procedures for improving positioning accuracy of the Release-16 NR positioning methods by mitigating UE receive (Rx)/transmit (Tx) and/or gNB Rx/Tx timing delays, including DL, UL and DL+UL positioning methods and/or UE-based and UE-assisted positioning solutions. Additionally, consideration is being given to procedure, measurements, reporting, and signalling for improving the accuracy of UL AoA for network-based positioning solutions and/or DL-AoD for UE-based and network-based (including UE-assisted) positioning solutions. As part of enhancements for DL-AoD, it is expected that reporting of positioning reference signal (PRS) reference signal received path power (RSRPP) for the first path of a specific PRS resource will be supported.

For both UE-based and UE-assisted DL-AOD, the UE can be requested subject to UE capability to measure and report (for UE-assisted) the PRS reference signal received power (RSRP) of the first path. The measured path DL PRS RSRP for $i^{th}$ path delay may be defined as the power of the received DL PRS signal configured for the measurement at the $i^{th}$ path delay of the channel response.

Additionally, path DL PRS RSRP for 1st path delay may be the power corresponding to the first detected path. It is noted that UE may choose to use a time window to compute path DL PRS RSRP by UE implementation. Further, the UE may report the time delay information for the $1^{st}$ path.

However, the definition of PRS RSRPP remains unclear. For example, PRS RSRPP might be defined as the path RSRP per resource element (RE), in the same way PRS RSRP is defined as power per RE.

Another remaining issue relates to reporting PRS RSRPP for the first path for DL-AoD. This new reporting feature on RSRP per path is not only for DL-AoD. For UL sounding reference signal (SRS) resource, the gNB may also reports RSRP for the first path from the following agreement.

For instance, for the first arrival path measurements on SRS for positioning resource, the gNB can report to LMF the following set of measurements: {one SRS-RSRP, multiple UL-AOAs (AoA/ZoA pairs), one UL-RTOA}, {one SRS-RSRP, multiple UL-AOAs (AoA/ZoA pairs), one-gNB Rx-Tx time difference}, or {multiple SRS-RSRP, multiple UL-AOAs (AoA/ZoA pairs), one UL-RTOA, one-gNB Rx-Tx time difference}.

For the first arrival path measurements on SRS for MIMO resource, the gNB can report to LMF the following set of measurements: {one SRS-RSRP, multiple UL-AOAs (AoA/ZoA pairs), one UL-RTOA}, or {multiple SRS-RSRP, multiple UL-AOAs (AoA/ZoA pairs), one UL-RTOA}. These gNB measurements may be associated with SRS resource ID and timestamp, which may also be reported to LMF. It is noted that the operation of SRS for multiple-input multiple-output (MIMO) may be transparent to the UE.

For Multi-RTT and DL-TDOA, the UE can report the path RSRP for the first path and additional paths. For instance, the UE may report the path RSRP for the first path and for additional paths as part of DL-TDOA, UL-TDOA, and multi-RTT reporting enhancements. Additionally, there may be support for introducing a request from the LMF to the UE/TRP when the path-RSRP for additional paths is desired to be reported, and/or support of path RSRP for additional paths as part of DL-AoD.

As outlined above, PRS RSRPP measurement may be defined as an absolute value and the current absolute and differential report mapping tables may be reused for this purpose. However, a reference measurement when differential reporting functionality is applied needs to be determined.

Thus, the UE may report PRS RSRPP for the first path as an absolute value for a specific PRS resource, and in higher layer signalling parameter for absolute value reporting has been captured as a tentative value. This might be a reasonable option to reduce the reporting signalling overhead and may work if there is no ambiguity from LMF side.

However, even if a specific PRS resource shows the maximum value of the $1^{st}$ path PRS RSRPP between multiple PRS resources, this does not guarantee that the transmission beam direction of this PRS resource is in line of sight (LoS) direction. That is, the maximum first path PRS RSRPP of a PRS resource does not guarantee that the shortest path power is the maximum. The ratio of the first path PRS RSRPP to the total power may constitute important information. In case the UE reports PRS RSRPP for the first path only, there is still ambiguity from LMF side.

In addition, DL-AoD does not currently support PRS RSRPP reporting for additional paths. If the LMF only knows the path power of the first path but not of any additional paths, it may not be able to properly determine if the "first path" is acceptable to use for DL-AoD calculation.

Certain embodiments can address at least this problem, for example, by ensuring the LMF has a sense of the percentage of the power coming from the first path. DL-TDoA and Multi-RTT techniques supports PRS RSRPP reporting for the first path and additional paths, but the LMF cannot expect that the UE would report RSRPP for all paths and/or PRS RSRP as the reporting is up to UE implementation and the LMF cannot indicate UE to report PRS RSRP and/or PRS RSRPP.

One solution may be that NR positioning restricts UE to report PRS RSRPP together with total PRS RSRP, but it is expected that the option of PRS RSRPP reporting only would also be accepted. Even if a differential reporting functionality is supported, the same problem can arise unless additional restrictions are placed on the differential reporting. For example, the UE may or may not be allowed to report PRS RSRPP for the same resource. Therefore, certain embodiments provide systems, devices, and/or methods to overcome at least the issues and problems discussed above, as well as other issues or problems which might not be explicitly mentioned herein.

As will be discussed in more detail in the following, certain embodiments may include LMF and/or UE behavior, in a case where the UE reports only PRS RSRPP for multiple PRS resources. It is noted that, as used herein, UE in this disclosure may also be called a user device or vice versa.

Additionally, it should be understood that UE or user device are not limited to cellular or mobile phones, but may also include any electronic device that may or may not be equipped with a transceiver or the like for wireless communication. For example, this can include, but is not limited to, computers, laptops, headsets, vehicles, cameras, sensors, or any other appropriate device that may or may not be described herein.

FIG. 1 illustrates an example signaling flow diagram 100, according to one embodiment. As illustrated in the example of FIG. 1, the signaling flow diagram 100 may include messages or information transmitted to and/or from a gNB, UE and/or LMF, for example. However, it should be noted that this is just one example and the signaling may include other network elements or network nodes.

According to an embodiment, the LMF and/or gNB may provide UE with positioning assistance information at least including PRS resource configuration. As illustrated in the example of FIG. 1, at 105, the gNB may transmit periodic DL RS (e.g., PRS) to the UE.

As further illustrated in the example of FIG. 1, at 110, the LMF may initiate DL-AoD, DL-TDOA, and/or Multi-RTT positioning to the UE. The UE may then report to the LMF, at 115, DL PRS RSRPP for the first path for multiple PRS resources and the UE reports a specific time stamp together with the DL PRS RSRPP measurements fort these multiple PRS resources where this time stamp represents when the UE obtained these DL PRS RSRPP measurements. The reporting at 115 may be performed using differential reporting or absolute reporting, for example.

In certain embodiments, the LMF may utilize the reported DL PRS RSRPP for the multiple PRS resources within a PRS resource set or a subset of PRS resources to estimate the location of the target UE.

According to an embodiment, the LMF may determine if it is necessary to obtain additional information on (total) PRS RSRP for each PRS resource. For example, the LMF may determine that a previous report of PRS RSRP is not valid for the UE so the LMF wants to obtain another update, and/or the LMF wants to see if the first path is dominant path.

Thus, in an embodiment, at 120, the LMF may request the UE to report (total) PRS RSRP for a set of PRS resources corresponding to the reported PRS RSRPP that the UE previously obtained at a specific time stamp. According to some embodiments, this time stamp may be the reported time stamp from the UE when the UE reports the DL PRS RSRPP for the set of PRS resources at 115.

As further illustrated in the example of FIG. 1, at 125, the UE may check its buffer data and its movement. According to some embodiments, the UE may receive, at 130, transmission of periodic DL RS (e.g., PRS).

In an embodiment, if the UE had not buffered or saved the PRS RSRP (e.g. total PRS RSRP) for the PRS resources that the UE had reported PRS RSRPP for the first path, or if the UE had not measured PRS RSRP (e.g. total PRS RSRP) for the reported PRS resources at the time corresponding to the indicated time stamp, and the UE has not moved compared to the indicated specific time stamp, as illustrated at 135, then the UE may measure PRS RSRP (e.g. total PRS RSRP) for the requested PRS resources by using the Rx beam(s) and Rx branch(es) which were used at the indicated time stamp. According to this embodiment, at 135, the UE may report the same time stamp as the indicated specific time stamp. In this case, the UE does not need additional measurement and reporting of PRS RSRPP for the first path.

In a further embodiment, if the UE had not buffered or saved the PRS RSRP (e.g. total PRS RSRP) for the PRS resources that the UE had reported PRS RSRPP for the first path, or if the UE had not measured PRS RSRP (e.g. total PRS RSRP) for the reported PRS resources at the time corresponding to the indicated specific time-stamp, and if the UE has moved over a threshold value compared to the indicated time stamp, then the UE may report new PRS RSRP and PRS RSRPP together for the PRS resources that the UE previously reported. In this case, the UE may report a new time stamp which is different than the indicated time stamp.

According to certain embodiments, if the UE had buffered or saved the PRS RSRP (e.g. total PRS RSRP) for the PRS resources that the UE had reported PRS RSRPP for the first path, and if the UE has not moved compared to the indicated time stamp, as illustrated at 140 in the example of FIG. 1, the UE may report the requested PRS RSRP for the set of PRS resources and may include a time stamp which is the same as the indicated time stamp.

In some embodiments, if the UE had buffered or saved the PRS RSRP (e.g. total PRS RSRP) for the PRS resources that the UE had reported PRS RSRPP for the first path, and if the UE has not moved for a certain time duration during ($t \in t_0$, $t_1$, $t_2$, where $t_0 \le t_1 \le t_2$), the UE can indicate the time stamp ($t_1$) of a previously reported PRS RSRP which is the same as the PRS RSRP at the indicated time stamp.

It is noted that the previously reported PRS RSRP may include time stamp $t_0$. In this case, effectively, the time stamp of the previously reported measurements {RSRPs, time stamp: $t_0$} for a set of PRS resources is replaced by $t_1$. According to this embodiment, the UE does not need to report all PRS RSRP measurements for the requested PRS resources.

According to certain embodiments, if the UE had buffered or saved the PRS RSRP (e.g. total PRS RSRP) for the PRS resources that the UE had reported PRS RSRPP for the first path, and if the UE has moved over a threshold value compared to the indicated time stamp, the UE may report new PRS RSRP and PRS RSRPP together for the PRS resources that the UE previously reported. In this embodiment, the UE may report a new time stamp which is different than the indicated time stamp.

In one embodiment, if the UE had not buffered or saved the PRS RSRP (e.g. total PRS RSRP) for the PRS resources that the UE had reported PRS RSRPP for the first path, or if the UE had not measured total PRS RSRP for the reported PRS resources at the time corresponding to the indicated time-stamp, then the UE may inform the LMF that it cannot follow the indication/request from LMF, as illustrated in the example of FIG. 1 at 145.

According to some embodiments, the UE may, at 150, delete the buffered measurement data, if any. As also illustrated in the example of FIG. 1, at 155, the LMF may re-estimates the location of the target UE using the reported measurements.

In one embodiment, the LMF may configure one or more thresholds for when the UE should report the RSRP along with the RSRPP. For example, the LMF can indicate that, if the RSRPP is not more than X % of the total power (RSRP), then the UE should include both PRS RSRPP and PRS RSRP for a PRS resource in the initial measurement report.

Similarly, the LMF can request the UE to exclude PRS RSRP when the UE reports PRS RSRPP for the first path for a PRS resource if the PRS RSRPP is dominant.

According to certain embodiments, the buffering capability may be different depending on the UE capability. The UE may report its measurement buffering capability to the LMF so that the LMF can consider it for measurement reporting request/indication.

As another embodiment, with DL PRS RSRPP, two kinds of received power value are specified. One power value is legacy PRS RSRP and another power value is PRS RSRPP. As one option, if a UE is capable of measuring or reporting only one measurement between PRS RSRP and PRS RSRPP, then the LMF can indicate which of PRS RSRP or PRS RSRPP should be measured and reported via pre-configuration. For example, the LMF may provide a RSRP type indicator to indicate whether PRS RSRP and/or PRS RSRPP should be measured and reported. Accordingly, UE may receive a request and/or indication which indicates reporting one measurement between PRS RSRP and PRS RSRPP, or both of PRS RSRP and PRS RSRPP.

In some embodiments, all or a part of the above-described UE behavior can be configured or indicated by the gNB and/or LMF.

Figure 2:
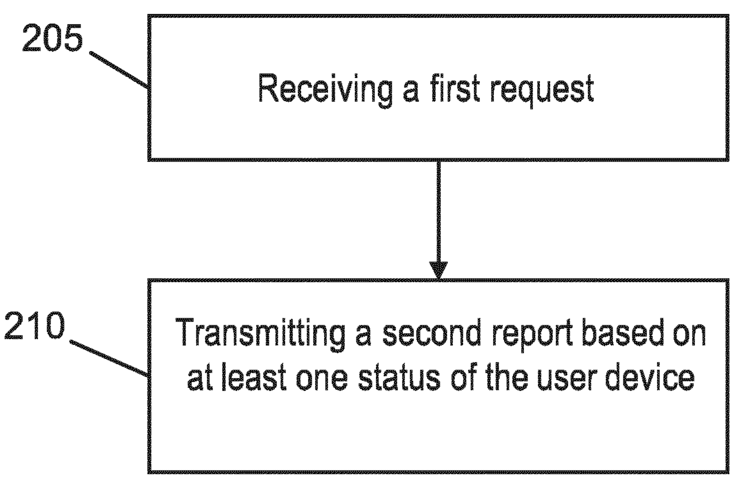
FIG. 2 illustrates an example flow diagram of a method, according to an embodiment.

FIG. 2 illustrates an example flow diagram of a method for positioning, according to an example embodiment. For instance, FIG. 2 may illustrate an example method of measurement reporting for DL and/or UL based positioning, according to some embodiments.

In certain example embodiments, the flow diagram of FIG. 2 may be performed by a network entity or communication device (or group of entities or devices) in a communications system such as, but not limited to, LTE, 5G NR, or 5G beyond. For instance, in some example embodiments, the communication device performing the method of FIG. 2 may include a UE, sidelink (SL) UE, user device, wireless device, mobile station, IoT device, UE type of roadside unit (RSU), a wireless transmit/receive unit, customer premises equipment (CPE), laptop, headset, vehicle, sensor, other mobile or stationary device, or the like. For instance, in certain example embodiments, the method of FIG. 2 may include procedures or operations performed by the UE, as described or illustrated elsewhere herein, such as in FIG. 1.

As illustrated in the example of FIG. 2, the method may include, at 205, receiving a first request, e.g., from a network node. For instance, the network node may be or may include a location management node, LMF, or other node responsible for location management services, or the like.

In some example embodiments, the first request may indicate to the user device to report PRS RSRP for a set of PRS resources corresponding to a previous report which indicated PRS RSRPP of the user device previously obtained at a first time stamp, for example using specific Rx beam(s) and Rx branch(es). For example, in some example embodiments, the first request may correspond to or may be similar to the request received by the UE at 120 in the example of FIG. 1.

According to certain example embodiments, the method of FIG. 2 may include, at 210, transmitting, to the network node, a second report based on at least one status of the user device. For example, in some example embodiments, the second report may correspond to or may be similar to one or more of the reports transmitted by the UE at 135, 140 or 145 in the example of FIG. 1. In an embodiment, the at least one status of the user device may include at least one of status of buffered data and/or status of movement.

According to certain example embodiments, the second report that is based on the at least one status of the user device may include one or more of: reporting a measured PRS RSRP using the same Rx beam and Rx branch used for measuring the PRS RSRPP when the user device has no buffered data and no movement, reporting a PRS RSRP and the first time stamp corresponding to the previous report when the user device has buffered data and no movement, and/or reporting an indicator which indicates without a valid measured PRS RSRP when the user device has moved.

In an embodiment, the method may include, or the transmitting 210 may include, reporting, by the user device, PRS RSRPP for the set of PRS resources for the first time stamp. According to an embodiment, the method may include, or the receiving 205 may include, receiving, by the user device, one or more thresholds that may indicate reporting RSRP along with the PRS RSRPP.

In one embodiment, the one or more thresholds may include or may indicate a percentage of RSRP (power) threshold. In this case, when the RSRPP is not greater than the percentage of RSRP threshold, the reporting may include the user device indicating both PRS RSRPP and PRS RSRP for the set of PRS resources.

In some embodiments, the method may include, or the receiving 205 may include, receiving, by the user device, a request from the network node to exclude PRS RSRP when the user device reports PRS RSRPP for the set of PRS resources if the PRS RSRPP is dominant.

According to an embodiment, the method may include or the transmitting 210 may include transmitting, by the user device, a measurement buffering capability to the network node.

It is noted that FIG. 2 is provided as one example of a method or process, according to certain embodiments. However, certain modifications, variations or adjustments to the process of FIG. 2 are possible according to further embodiments, as may be discussed elsewhere herein.

Figure 3:
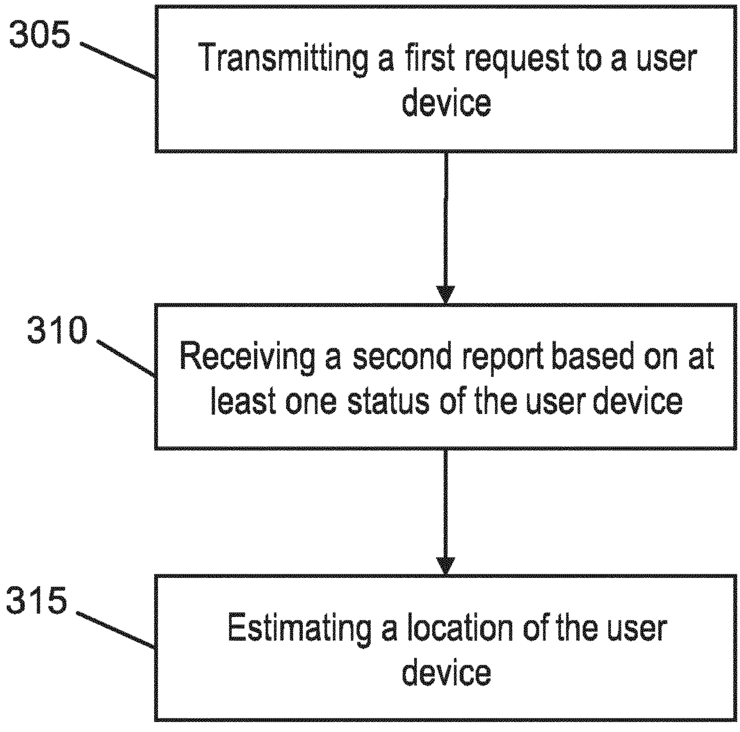
FIG. 3 illustrates an example flow diagram of a method, according to an embodiment.

FIG. 3 illustrates an example flow diagram of a method for positioning, according to an example embodiment. For instance, FIG. 3 may illustrate an example method of measurement reporting for DL and/or UL based positioning, according to some embodiments.

In certain example embodiments, the flow diagram of FIG. 3 may be performed by a network entity or communication device in a communications system such as, but not limited to, LTE, 5G NR, or 5G beyond. For instance, in some example embodiments, the device performing the method of FIG. 3 may include a location management entity or LMF. For instance, in some embodiments, the method of FIG. 3 may include procedures or operations performed by a LMF, as described or illustrated elsewhere herein, such as in FIG. 1.

As illustrated in the example of FIG. 3, the method may include, at 305, transmitting a first request to a user device. In some example embodiments, the first request may indicate to the user device to report PRS RSRP for a set of PRS resources corresponding to a previous report which indicated PRS RSRPP of the user device previously obtained at a first time stamp, for example using specific Rx beam(s) and Rx branch(es). For example, in some example embodiments, the first request may correspond to or may be similar to the request transmitted by the LMF at 120 in the example of FIG. 1.

According to an embodiment, the method of FIG. 3 may include, at 310, receiving a second report based on at least one status of the user device. For example, in some example embodiments, the second report may correspond to or may be similar to one or more of the reports received by the LMF at 135, 140 or 145 in the example of FIG. 1. In an embodiment, the at least one status of the user device may include at least one of status of buffered data and/or status of movement.

According to certain example embodiments, the second report that is based on the at least one status of the user device may include one or more of: a measured PRS RSRP using the same Rx beam and Rx branch used for measuring the PRS RSRPP when the user device has no buffered data and no movement, a PRS RSRP and the first time stamp corresponding to the previous report when the user device has buffered data and no movement, and/or an indicator which indicates without a valid measured PRS RSRP when the user device has moved.

In some example embodiments, the method of FIG. 3 may include, at 315, estimating a location of the user device based on the PRS RSRP for the set of PRS resources reported in the second report.

According to certain example embodiments, the method may include, or the receiving 310 may include, receiving, from the user device, PRS RSRPP for the set of PRS resources for the first time stamp.

In some example embodiments, the method may include, or the transmitting 305 may include, transmitting, to the user device, one or more thresholds. The one or more thresholds may indicate reporting RSRP along with the PRS RSRPP. In one embodiment, the one or more thresholds may include or may indicate a percentage of RSRP (power) threshold. In this case, when the RSRPP is not greater than the percentage of RSRP threshold, the method may include, or the receiving 310 may include, receiving, from the user device, an indication of both PRS RSRPP and PRS RSRP for the set of PRS resources.

According to certain embodiments, the method may include, or the transmitting 305 may include, transmitting, to the user device, a request to exclude PRS RSRP when the user device reports PRS RSRPP for the set of PRS resources if the PRS RSRPP is dominant. In an example embodiment, the method may include, or the receiving 310 may include, receiving a measurement buffering capability from the user device.

It is noted that FIG. 3 is provided as one example of a method or process, according to certain embodiments. However, it should be understood that certain modifications, variations or adjustments to the process of FIG. 3 are possible according to further embodiments, as may be discussed elsewhere herein.

Figure 4:
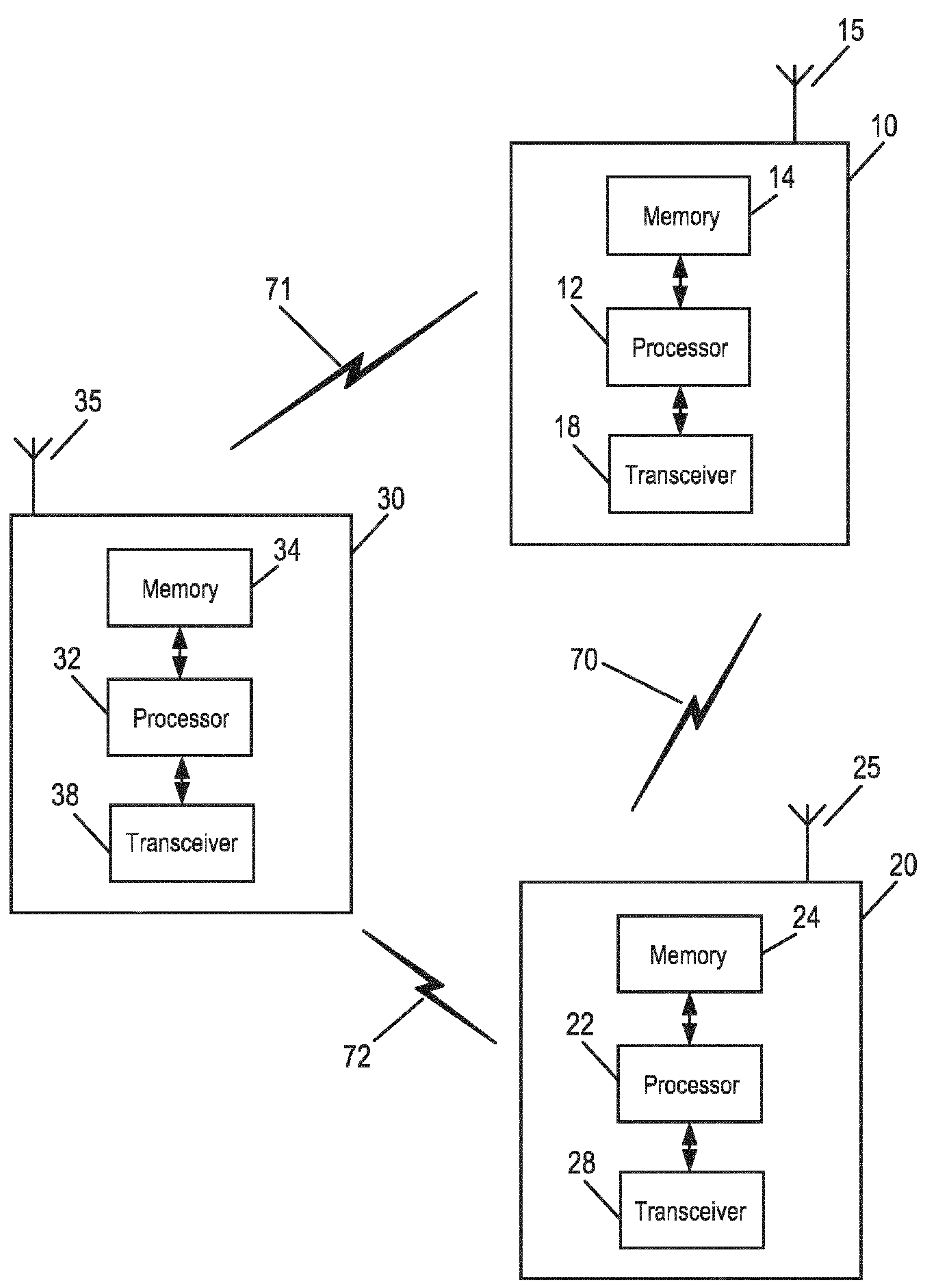
FIG. 4 illustrates an example of a system including multiple apparatuses, according to certain embodiments.

FIG. 4 illustrates an example of an apparatus 10, apparatus 20, and apparatus 30, according to certain example embodiments. In an embodiment, apparatus 10 may be a node, host, or server in a communications network or serving such a network.

For example, in one embodiment, apparatus 10 may be or may be included in a UE, user device, mobile equipment (ME), mobile station, mobile device, stationary device, IoT device, TSN device, or other device. As described herein, UE may alternatively be referred to as, for example, a mobile station, mobile equipment, mobile unit, mobile device, user device, subscriber station, wireless terminal, laptop, tablet, smart phone, IoT device, sensor or NB-IoT device, or the like. As one example, apparatus 10 may be implemented in, for instance, a wireless handheld device, a wireless plug-in accessory, or the like. It should be noted that one of ordinary skill in the art would understand that apparatus 10 may include components or features not shown in FIG. 4.

As illustrated in the example of FIG. 4, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory.

For example, memory 14 can be comprised of any combination of random access memory (RAM), read only memory (ROM), static storage such as a magnetic or optical disk, hard disk drive (HDD), or any other type of non-transitory machine or computer readable media.

The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information.

The transceiver 18 may include, for example, a plurality of radio interfaces that may be coupled to the antenna(s) 15. The radio interfaces may correspond to a plurality of radio access technologies including one or more of LTE, 5G, WLAN, NB-IoT, Bluetooth, BT-LE, NFC, radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. In certain example embodiments, transceiver 18 may be configured as a transceiving means for transmitting and/or receiving information as discussed elsewhere herein.

Additionally or alternatively, in some embodiments, apparatus 10 may include an input and/or output device (I/O device) or means. In certain embodiments, apparatus 10 may further include a user interface, such as a graphical user interface or touchscreen.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry, processing circuitry and/or control circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may include a UE (e.g., SL UE), user device, mobile device, mobile station, ME, IoT device and/or NB-IoT device, for example. For example, in some embodiments, apparatus 10 may be configured to perform one or more of the processes depicted in any of the flow charts or signaling diagrams described herein, such as those illustrated in the examples of FIG. 1 and/or FIG. 2.

For instance, in some embodiments, apparatus 10 may be configured to perform one or more of the operations performed by the UE illustrated in FIG. 1. In some embodiments, as discussed herein, apparatus 10 may be configured to perform a procedure relating to positioning measurement reporting, for instance.

According to certain embodiments, transceiver 18 may be configured to receive a first request, e.g., from a network node. In some example embodiments, the first request may indicate to the apparatus 10 to report PRS RSRP for a set of PRS resources corresponding to a previous report which indicated PRS RSRPP of the apparatus 10 previously obtained at a first time stamp. For example, in some example embodiments, the first request may correspond to or may be similar to the request received by the UE at 120 in the example of FIG. 1.

According to certain example embodiments, transceiver 18 may be configured to transmit, to the network node, a second report based on at least one status of the apparatus 10. For example, in some example embodiments, the second report may correspond to or may be similar to one or more of the reports transmitted by the UE at 135, 140 or 145 in the example of FIG. 1. In an embodiment, the at least one status of the apparatus 10 may include at least one of status of buffered data and/or status of movement.

According to certain example embodiments, the second report that is based on the at least one status of the apparatus 10 may include one or more of: reporting a measured PRS RSRP using the same Rx beam and Rx branch used for measuring the PRS RSRPP when the apparatus 10 has no buffered data and no movement, reporting a PRS RSRP and the first time stamp corresponding to the previous report when the apparatus 10 has buffered data and no movement, and/or reporting an indicator which indicates without a valid measured PRS RSRP when the apparatus 10 has moved.

In an embodiment, transceiver 18 may be configured to report, to the network node, PRS RSRPP for the set of PRS resources for the first time stamp. According to an embodiment, transceiver 18 may be configured to receive, from the network node, one or more thresholds that may indicate reporting RSRP along with the PRS RSRPP. In one embodiment, the one or more thresholds may include or may indicate a percentage of RSRP (power) threshold. In this case, when the RSRPP is not greater than the percentage of RSRP threshold, transceiver 18 may be configured to report or indicate, to the network node, both PRS RSRPP and PRS RSRP for the set of PRS resources.

In some embodiments, transceiver 18 may be configured to receive, from the network node, a request to exclude PRS RSRP when the apparatus 10 reports PRS RSRPP for the set of PRS resources if the PRS RSRPP is dominant. According to an embodiment, transceiver 18 may be configured to transmit, to the network node, a measurement buffering capability.

FIG. 4 further illustrates an example of an apparatus 20, according to an embodiment. In an embodiment, apparatus 20 may be a node, host, or server in a communications network or serving such a network. For example, apparatus 20 may be a network node, satellite, base station, a Node B, an evolved Node B (eNB), 5G Node B or access point, next generation Node B (NG-NB or gNB), TRP, HAPS, Remote Radio Head (RRH), integrated access and backhaul (IAB) node, and/or a WLAN access point, associated with a radio access network, such as a LTE network, 5G or NR, or 6G. In some example embodiments, apparatus 20 may be gNB or other similar radio node, for instance.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection.

For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 4.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4.

As illustrated in the example of FIG. 4, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

While a single processor 22 is shown in FIG. 4, multiple processors may be utilized according to other embodiments. For example, it should be understood that, in certain embodiments, apparatus 20 may include more than one processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory.

For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means, processing circuitry/means or control circuitry/means.

As discussed above, according to some embodiments, apparatus 20 may be or may be a part of a network element or RAN node, such as a base station, access point, Node B, eNB, gNB, TRP, RRH, HAPS, IAB node, relay node, WLAN access point, satellite, or the like. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-3.

In certain embodiments, apparatus 20 may include or represent a network node, such as the gNB illustrated in the example of FIG. 1. According to an embodiment, apparatus may be configured to perform a procedure relating to positioning measurement reporting, for instance.

In certain embodiments, transceiver 28 may be configured to transmit periodic DL RS (e.g., PRS) to one or more UEs.

FIG. 4 further illustrates an example of an apparatus 30, according to an example embodiment. In an example embodiment, apparatus 30 may be a node or element in a communications network or associated with such a network, such as a location management entity or LMF, or similar node configured for location management, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 4.

As illustrated in the example of FIG. 4, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 4, multiple processors may be utilized according to other example embodiments.

For example, it should be understood that, in certain example embodiments, apparatus may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory.

For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry, processing circuitry or control circuitry.

As discussed above, according to some example embodiments, apparatus 30 may be or may include a location management entity or LMF, for example. According to certain example embodiments, apparatus 30 may be controlled by memory 34 and/or processor 32 to perform the functions associated with example embodiments described herein. For instance, in some example embodiments, apparatus 30 may be configured to perform one or more of the processes depicted in any of the diagrams or signaling flow diagrams described herein, such as the process illustrated in the example of FIG. 1 and/or FIG. 3. As an example, apparatus 30 may correspond to or represent the LMF, such as that illustrated in the example of FIG. 1. According to certain example embodiments, apparatus 30 may be configured to perform a procedure relating to positioning measurement reporting, for instance.

In some embodiments, transceiver 38 may be configured to transmit a first request to a user device. In some example embodiments, the first request may indicate to the user device to report PRS RSRP for a set of PRS resources corresponding to a previous report which indicated PRS RSRPP of the user device previously obtained at a first time stamp. For example, in some example embodiments, the first request may correspond to or may be similar to the request transmitted by the LMF at 120 in the example of FIG. 1.

According to an embodiment, transceiver 38 may be configured to receive a second report based on at least one status of the user device. For example, in some example embodiments, the second report may correspond to or may be similar to one or more of the reports received by the LMF at 135, 140 or 145 in the example of FIG. 1. In an embodiment, the at least one status of the user device may include at least one of status of buffered data and/or status of movement.

According to certain example embodiments, the second report that is based on the at least one status of the user device may include one or more of: a measured PRS RSRP using the same Rx beam and Rx branch used for measuring the PRS RSRPP when the user device has no buffered data and no movement, a PRS RSRP and the first time stamp corresponding to the previous report when the user device has buffered data and no movement, and/or an indicator which indicates without a valid measured PRS RSRP when the user device has moved.

In some example embodiments, memory 34 and/or processor 32 may be configured to estimate a location of the user device based on the PRS RSRP for the set of PRS resources reported in the second report.

According to certain example embodiments, transceiver 38 may be configured to receive, from the user device, PRS RSRPP for the set of PRS resources for the first time stamp.

In some example embodiments, transceiver 38 may be configured to transmit, to the user device, one or more thresholds. The one or more thresholds may indicate reporting RSRP along with the PRS RSRPP. In one embodiment, the one or more thresholds may include or may indicate a percentage of RSRP (power) threshold. In this case, when the RSRPP is not greater than the percentage of RSRP threshold, transceiver 38 may be configured to receive, from the user device, an indication of both PRS RSRPP and PRS RSRP for the set of PRS resources.

According to certain embodiments, transceiver 38 may be configured to transmit, to the user device, a request to exclude PRS RSRP when the user device reports PRS RSRPP for the set of PRS resources if the PRS RSRPP is dominant. In an example embodiment, transceiver 38 may be configured to receive a measurement buffering capability from the user device.

In some example embodiments, an apparatus (e.g., apparatus 10 and/or apparatus 20 and/or apparatus 30) may include means for performing one or more methods, processes and/or procedures, or any of the variants discussed herein. Examples of the means may include, but are not limited to, one or more processors, memory, controllers, transmitters, receivers, sensors, circuits, and/or computer program code for causing the performance of any of the operations discussed herein, such as those illustrated or discussed in connection with FIGS. 1-3.

In view of the foregoing, certain example embodiments provide several technological improvements, enhancements, and/or advantages over existing technological processes and constitute an improvement at least to the technological field of wireless network control and/or management.

For example, as discussed in detail above, certain example embodiments can provide systems, apparatuses, devices and/or methods of measurement reporting for DL and/or UL based positioning. As a result, example embodiments can improve accuracy including positioning measurement accuracy. For instance, certain embodiments provide positioning accuracy improvement of DL AoD positioning. In addition, some example embodiments can provide improved network efficiency, for example by avoiding unnecessary reporting overhead. Further, example embodiments can result in reduced UE power consumption and/or UE power saving. Accordingly, the use of certain example embodiments results in improved functioning of communications networks and their nodes, such as base stations, eNBs, gNBs, and/or IoT devices, UEs or mobile stations, or the like.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations needed for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, some functionality of example embodiments may be implemented as a signal that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Some embodiments described herein may use or refer to the conjunction "and/or". It should be noted that, when used, the term "and/or" is intended to include either of the alternatives or both of the alternatives, depending on the example embodiment or implementation. In other words, "and/or" can refer to one or the other or both, or any one or more or all, of the things or options in connection with which the conjunction is used.

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

| PARTIAL GLOSSARY: | |
|---|---|
| PRS | Positioning Reference Signal |
| gNB | 5G Base Station |
| LOS | Line of Sight |
| NR | New Radio (5G) |
| RS | Reference Signal |
| RSRP | Reference Signal Received Power |
| RSRPP | Reference Signal Received Path Power |
| Rx | Receive/ Receiver |

-continued

| PARTIAL GLOSSARY: | |
|---|---|
| RE | Resource Element |
| Tx | Transmit/ Transmitter |
| SRS | Sounding Reference Signal |
| AoA | Angle of Arrival |
| ToA | Time of Arrival |
| RToA | Relative Time of Arrival |
| UE | User Equipment |
| DL | Downlink |
| UL | Uplink |
| LMF | Location Management Function |
| NRPPa | NR Positioning Protocol a |
| LPP | LTE Positioning Protocol |
| PUSCH | Physical Uplink Shared Channel. |

The invention claimed is:

1. An apparatus, comprising:

at least one processor, at least one memory storing computer program codes, that when executed by the at least one processor, cause the apparatus at least to:

receive a first request, wherein the first request indicates to the apparatus to report positioning reference signal (PRS) reference signal received power (RSRP) for a set of PRS resources corresponding to a previous report which indicated PRS reference signal received path power (RSRPP) of the apparatus previously obtained at a first timestamp; and transmit a second report based on at least one status of the apparatus, wherein the at least one status of the apparatus comprises at least one of status of buffered data or status of movement, wherein the second report comprises at least one of:

a measured PRS RSRP using the same receive (Rx) beam and Rx branch used for measuring the PRS RSRPP when the apparatus has no buffered data and no movement;

a PRS RSRP and the first timestamp corresponding to the previous report when the apparatus has buffered data and no movement; or an indicator which indicates without a valid measured PRS RSRP when the apparatus has moved.

2. The apparatus according to claim 1, wherein the at least one memory storing computer program codes that, when executed by the at least one processor, further cause the apparatus to:

report PRS RSRPP for the set of PRS resources for the first timestamp.

3. The apparatus according to claim 1, wherein the at least one memory storing computer program codes that, when executed by the at least one processor, further cause the apparatus to:

receive one or more thresholds, wherein the one or more thresholds indicates reporting RSRP along with the PRS RSRPP.

4. The apparatus according to claim 3, wherein the one or more thresholds comprise a percentage of RSRP threshold; and when the RSRPP is not greater than the percentage of RSRP threshold, the at least one memory storing computer program codes that, when executed by the at least one processor, further cause the apparatus to indicate both PRS RSRPP and PRS RSRP for the set of PRS resources.

5. The apparatus according to claim 1, wherein the at least one memory storing computer program codes that, when executed by the at least one processor, further cause the apparatus to:

receive a request from a network node to exclude PRS RSRP when the apparatus reports PRS RSRPP for the set of PRS resources if the PRS RSRPP is dominant.

6. The apparatus according to claim 1, wherein the at least one memory storing computer program codes that, when executed by the at least one processor, further cause the apparatus to:

transmit a measurement buffering capability to a network node.

7. The apparatus according to claim 1, wherein the apparatus comprises a user device.

8. An apparatus, comprising:

at least one processor, at least one memory storing computer program codes, that when executed by the at least one processor cause the apparatus at least to:

transmit a first request to a user device, wherein the first request indicates to the user device to report positioning reference signal (PRS) reference signal received power (RSRP) for a set of PRS resources corresponding to a previous report which indicated PRS reference signal received path power (RSRPP) of the user device previously reported with a first timestamp, and receive a second report based on at least one status of the user device, wherein the at least one status of the user device comprises at least one of status of buffered data or status of movement, wherein the second report comprises at least one of:

a measured PRS RSRP using the same receive (Rx) beam and Rx branch used for measuring the PRS RSRPP when the user device has no buffered data and no movement; or a PRS RSRP and the first timestamp corresponding to the previous report when the user device has buffered data and no movement; or an indicator which indicates without a valid measured PRS RSRP when the user device has moved.

9. The apparatus according to claim 8, wherein the at least one memory storing computer program codes that, when executed by the at least one processor, further cause the apparatus to:

estimate a location of the user device based on the PRS RSRP for the set of PRS resources reported in the second report.

10. The apparatus according to claim 8, wherein the at least one memory storing computer program codes that, when executed by the at least one processor, further cause the apparatus to:

receive, from the user device, PRS RSRPP for the set of PRS resources for the first timestamp.

11. The apparatus according to claim 8, wherein the at least one memory storing computer program codes that, when executed by the at least one processor, further cause the apparatus to:

transmit, to the user device, one or more thresholds, wherein the one or more thresholds indicates reporting RSRP along with the PRS RSRPP.

12. The apparatus according to claim 11, wherein the one or more thresholds comprise a percentage of RSRP threshold; and when the RSRPP is not greater than the percentage of RSRP threshold, the at least one memory storing computer program codes that, when executed by the at least one processor, further cause the apparatus to receive both PRS RSRPP and PRS RSRP for the set of PRS resources.

13. The apparatus according to claim 11, wherein the at least one memory storing computer program codes that, when executed by the at least one processor, further cause the apparatus to:

transmit, to the user device, a request to exclude PRS RSRP when the user device reports PRS RSRPP for the set of PRS resources if the PRS RSRPP is dominant.

14. The apparatus according to claim 11, wherein the at least one memory storing computer program codes that, when executed by the at least one processor, further cause the apparatus to:

receive a measurement buffering capability from the user device.

15. The apparatus according to claim 11, wherein the apparatus comprises a location management function.

16. A method, comprising:

receiving, by a user device, a first request, wherein the first request indicates to report positioning reference signal (PRS) reference signal received power (RSRP) for a set of PRS resources corresponding to a previous report which indicated PRS reference signal received path power (RSRPP) of the user device previously obtained at a first timestamp; and transmitting, by the user device, a second report based on at least one status of the user device, wherein the at least one status of the user device comprises at least one of status of buffered data or status of movement, wherein the second report comprises at least one of:

a measured PRS RSRP using the same receive (Rx) beam and Rx branch used for measuring the PRS RSRPP when the user device has no buffered data and no movement; or a PRS RSRP and the first timestamp corresponding to the previous report when the user device has buffered data and no movement; or an indicator which indicates without a valid measured PRS RSRP when the user device has moved.

17. The method of claim 16, further comprising reporting, by the user device, PRS RSRPP for the set of PRS resources for the first timestamp.

18. The method of claim 16, further comprising receiving, by the user device, one or more thresholds, wherein the one or more thresholds indicates reporting RSRP along with the PRS RSRPP.

19. The method of claim 16, wherein the one or more thresholds comprise a percentage of RSRP threshold, and when the RSRPP is not greater than the percentage of RSRP threshold, the method further comprising indicating both PRS RSRPP and PRS RSRP for the set of PRS resources.

20. The method of claim 16, further comprising receiving, by the user device, a request from a network node to exclude PRS RSRP when the apparatus reports PRS RSRPP for the set of PRS resources if the PRS RSRPP is dominant.

* * * * *